US008995248B2

(12) United States Patent
Chang et al.

(10) Patent No.: US 8,995,248 B2
(45) Date of Patent: Mar. 31, 2015

(54) APPARATUS FOR ADJUSTING POWER AND METHOD THEREOF (75) Inventors: Wei-Hsuan Chang, Hsinchu (TW); Chung-Yao Chang, Hsinchu (TW); Der-Zheng Liu, Hsinchu (TW); Kuang-Yu Yen, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 3 days.

(21) Appl. No.: 13/372,612

(22) Filed: Feb. 14, 2012

(65) Prior Publication Data

US 2012/0213104 A1    Aug. 23, 2012

(30) Foreign Application Priority Data

Feb. 18, 2011   (TW) .............................. 100105548 A (51) Int. Cl.
    H04J 1/16        (2006.01)
    H04W 52/28       (2009.01)
    H04W 52/36       (2009.01)
    H04W 52/48       (2009.01)

(52) U.S. Cl.
    CPC .......... *H04W 52/286* (2013.01); *H04W 52/362* (2013.01); *H04W 52/48* (2013.01)
    USPC ............................ 370/216; 370/236; 370/342

(58) Field of Classification Search
    USPC .................... 370/252, 326, 216, 236, 342
    See application file for complete search history.

(56) References Cited

U.S. PATENT DOCUMENTS

| 4,580,262 | A   | * | 4/1986  | Naylor et al. ........... 714/708 |
| 6,898,193 | B2  |   | 5/2005  | Saifuddin |
| 6,898,493 | B2  | * | 5/2005  | Ehrman et al. .......... 701/29.6 |
| 6,983,164 | B2  | * | 1/2006  | Kajimura ................ 455/522 |
| 7,372,834 | B2  | * | 5/2008  | Kim et al. ............... 455/522 |
| 7,389,088 | B2  | * | 6/2008  | Kim ....................... 455/41.1 |
| 7,433,328 | B2  | * | 10/2008 | Kim et al. ............... 370/278 |
| 7,570,970 | B2  | * | 8/2009  | Duan et al. .............. 455/522 |
| 7,898,961 | B2  | * | 3/2011  | Jang et al. ............... 370/236 |
| 7,962,823 | B2  | * | 6/2011  | Olgaard .................. 714/742 |
| 2002/0027897 | A1 | * | 3/2002  | Moulsley et al. ........ 370/342 |
| 2005/0058154 | A1 | * | 3/2005  | Lee et al. ................ 370/473 |

(Continued)

FOREIGN PATENT DOCUMENTS

TW    201105157 A1    2/2011

OTHER PUBLICATIONS

Office action issued on Oct. 22, 2013 from Taiwanese Patent Office in a counterpart Taiwanese patent application No. TW 100105548.

(Continued)

*Primary Examiner* — Ricky Ngo
*Assistant Examiner* — Dewanda Samuel
(74) *Attorney, Agent, or Firm* — The PL Law Group, PLLC (57) ABSTRACT A power adjusting apparatus communicating with a remote terminal is provided. The apparatus includes: a transceiving unit transmitting a plurality of test packets by a plurality of powers; a processing unit coupled to the transceiving unit, and deciding a transmission power for transmitting a subsequent packet according to at least one retransmission number of transmitting the test packets.

13 Claims, 10 Drawing Sheets

(56) References Cited

U.S. PATENT DOCUMENTS

| | | |
|---|---|---|
| 2006/0068825 A1* | 3/2006 | Iochi .............................. 455/522 |
| 2006/0168343 A1* | 7/2006 | Ma et al. ........................ 709/245 |
| 2007/0201364 A1 | 8/2007 | Nakajima et al. |
| 2007/0291646 A1 | 12/2007 | Ohishi et al. |
| 2012/0170586 A1* | 7/2012 | Roberts et al. ................ 370/400 |

OTHER PUBLICATIONS

Office action issued on Feb. 25, 2014 from China Patent Office in a counterpart Chinese patent application.

* cited by examiner

APPARATUS FOR ADJUSTING POWER AND METHOD THEREOF

CROSS-REFERENCE TO RELATED APPLICATION AND CLAIM OF PRIORITY

The application claims the benefit of Taiwan Patent Application No. 100105548, filed on Feb. 18, 2011, in the Taiwan Intellectual Property Office, the disclosures of which are incorporated herein in their entirety by reference.

FIELD OF THE INVENTION

The present invention claims the benefits of priority from the Taiwanese Patent Application No. 100105548, filed on Feb. 18, 2011, the contents of the specification of which are hereby incorporated herein by reference.

The present invention relates to a power adjusting apparatus and power adjusting method thereof, and more particularly to a power adjusting apparatus and power adjusting method thereof in a wireless system.

BACKGROUND OF THE INVENTION

In the wireless communication system, the transmitting terminal usually implements transmissions by the maximum power in order that the transmission apparatus could transmit packets as far as possible. However, when there is a rather short distance between the receiving terminal and the transmitting terminal, the packet transmission which the transmitting terminal implements by the maximum power would result in the wasted power, and at the same time, it is possible that the packet could not be correctly received owing to the saturation or clipping of the signals received by the receiving terminal. Therefore, if the distance between the transmitting terminal and the receiving terminal could be correctly calculated, the transmission power at the transmitting terminal could be adaptively changed, so that the transmitting terminal could achieve the same or even better transmission efficiency by less power.

There has been such one method that the signal strength of the packet received by the transmitting terminal is used to judge the distance between the transmitting terminal and the receiving terminal. However, an incorrect judgment would possibly occur if the distance is judged according to the signal strength. This is because, in the air, either the refraction, reflection, or diffraction of a signal would result in the signal fading, which would result in the decreasing signal strength or the increasing bit error rate of the packet received by the transmitting terminal. For example, when there is the low strength of the signal received by the transmitting terminal, the transmitting terminal would judge that it is relatively far from the receiving terminal. As a result, the transmitting terminal would transmit the packet by a higher transmission power, which would result in a wasted transmission power. Instead, when there is the high strength of the signal received by the transmitting terminal, the transmitting terminal would judge that it is relatively close to the receiving terminal. As a result, the transmitting terminal would transmit the packet by a lower transmission power, and therefore the receiving terminal could not receive the packet. Thus, in a certain situation, it is inappropriate to determine the distance between the transmitting terminal and the receiving terminal based on the signal strength.

SUMMARY OF THE INVENTION

To overcome the abovementioned drawback, the present invention provides a power adjusting apparatus communicating with a remote terminal. It is a first aspect of the present invention to provide a power adjusting apparatus including: a transceiving unit transmitting a plurality of test packets by a plurality of powers; and a processing unit coupled to the transceiving unit, and deciding a transmission power for transmitting a subsequent packet according to at least one retransmission number of transmitting the test packets.

It is a second aspect of the present invention to provide a power adjusting method including a step of: deciding a transmission power for transmitting a subsequent packet according to at least one retransmission number of transmitting a plurality of test packets by using a plurality of powers.

It is a third aspect of the present invention to provide a power adjusting apparatus communicating with a remote terminal, the apparatus including: a transceiving unit transmitting a test packet by a plurality of powers; and a processing unit coupled to the transceiving unit, and deciding a transmission power based on one of an ACK message and an ACK timeout message associated with the test packet to transmit a subsequent packet.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The first embodiment of the present invention is related to a power adjusting apparatus which comprises a transceiver unit and a processing unit and is used to communicate with a remote terminal. The transceiving unit uses a plurality of powers to transmit a plurality of test packets. The processing unit is coupled to the transceiving unit, and, based on a retransmission number of transmitting the test packets, decides a transmission power for transmitting a subsequent packet.

Figure 1A:
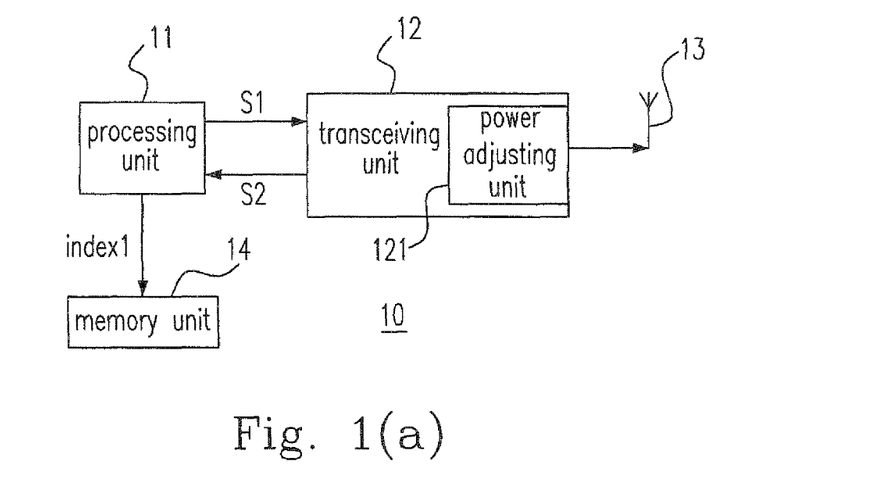
FIG. 1(a) is a schematic diagram illustrating a power adjusting apparatus in a first preferred embodiment according to the present invention.

Please refer to FIG. 1(a) illustrating the power adjusting apparatus in a first embodiment according to the present invention. The power adjusting apparatus 10 includes a processing unit 11, a transceiving unit 12, an antenna 13, and a memory unit 14. The transceiving unit 12 includes a power adjusting unit 121 which adjusts powers. The transceiving unit 12 is further configured with a receiving unit (not shown) for receiving an acknowledgement (ACK) message.

Figure 1B:
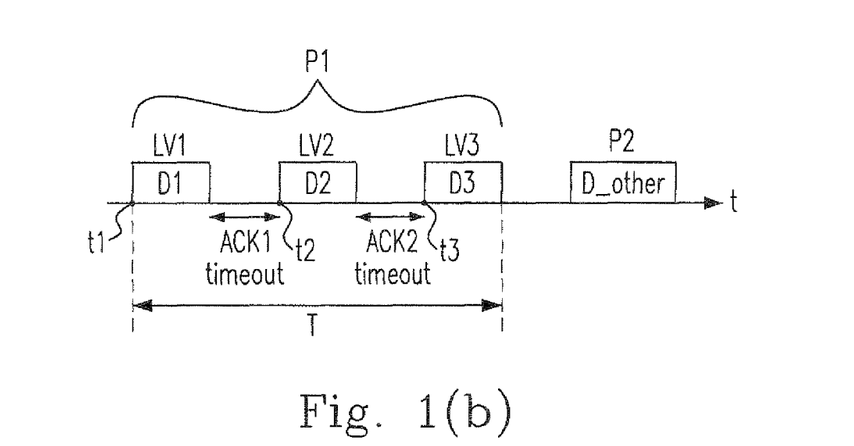
FIG. 1(b) is a schematic diagram illustrating the transmission situation of a plurality of test packets in a training period T according to the present invention.
Figure 1C:
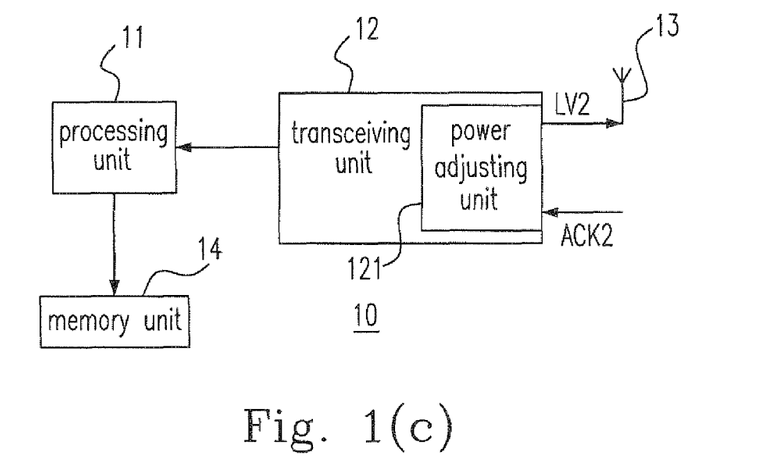
FIG. 1(c) is a schematic diagram of receiving an acknowledgement in the first preferred embodiment according to the present invention.

Please refer to FIG. 1(b) which illustrates the situation that a plurality of test packets are transmitted in a training period according to the present invention. In FIG. 1(b), T represents the training period, and D1 represents a first packet.

Please refer to both FIGS. 1(a) and 1(b). In the training period T, the processing unit 11 transmits a control signal S1 to the transceiving unit 12 for controlling the power adjusting unit 121 to transmit a first packet D1 by a power LV1. At the same time, the processing unit 11 stores an index value index1 which is related to a dB value of the power LV1 into the memory unit 14. If the power adjusting apparatus 10 does not receive the ACK1 message in the ACK1 timeout period, the transceiving unit 12 reports the information S2 to the processing unit 11, wherein the information S2 includes the ACK1 timeout message. After receiving the ACK1 timeout message, the processing unit 11 controls the power adjusting unit 121 to use another power LV2 higher than the power LV1, so that the transceiving unit 12 transmits a second packet D2 by the power LV2 at the time t2. At the same time, the processing unit 11 stores an index value index2 (not shown) which is related to a dB value of the power LV2 into the memory unit 14.

Similarly, if the power adjusting apparatus 10 does not receive the ACK2 message in an ACK2 timeout period, the transceiving unit 12 reports the message S3 (not shown) to the processing unit 11, wherein the message S3 includes an AKC2 timeout message. After receiving the ACK2 timeout message, the processing unit controls the power adjusting unit 121 to use another power LV3 higher than the power LV2, so that the transceiving unit 12 transmits a third packet D3 by the power LV3 at the time t3. At the same time, the processing unit 11 stores an index value index3 (not shown) which is related to a dB value of the power LV3 into the memory unit 14.

Figure 1D:
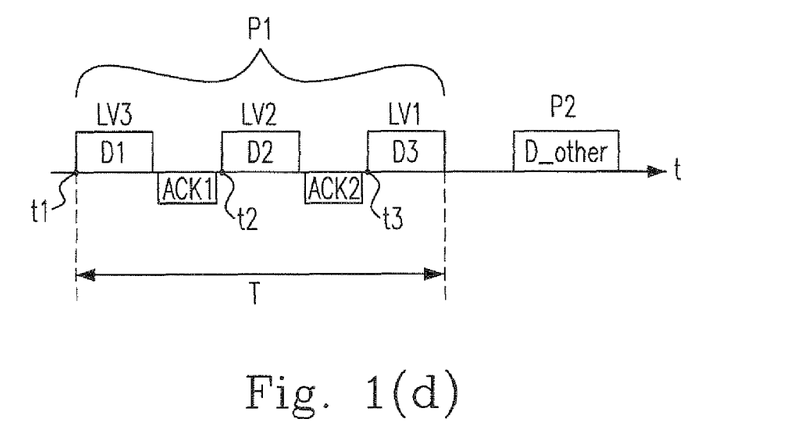
FIG. 1(d) is a schematic diagram of a transmission situation of packet transmissions in the training period in a second preferred embodiment according to the present invention.

Please refer to FIG. 1(d) illustrating a situation where packets are transmitted in the training period T in a second preferred embodiment according to the present invention. In the training period T in FIG. 1(d), the first packet D1 is transmitted by the power LV 3 at the time t1. After the power adjusting apparatus 10 receives the ACK1, the processing unit 11 controls the power adjusting unit 121 to transmit a packet by another power LV2 lower than the power LV3. In other words, at the time t2, a second packet D2 is transmitted by the power LV2. After the power adjusting apparatus 10 receives the ACK2, the processing unit 11 controls the power adjusting unit 121 to transmit a packet by another power LV1 lower than the power LV2. In other words, at the time t3, a third packet D3 is transmitted by the power LV1. The similar procedures proceed until no ACK message could be received.

In a second preferred embodiment, according to the power used for the last ACK message which is successfully received, the processing unit 11 controls the power adjusting unit 121 to transmit a subsequent packet D_other. In a different application, the plurality of test packets D1~D3 could also be the same packets.

Figure 2A:
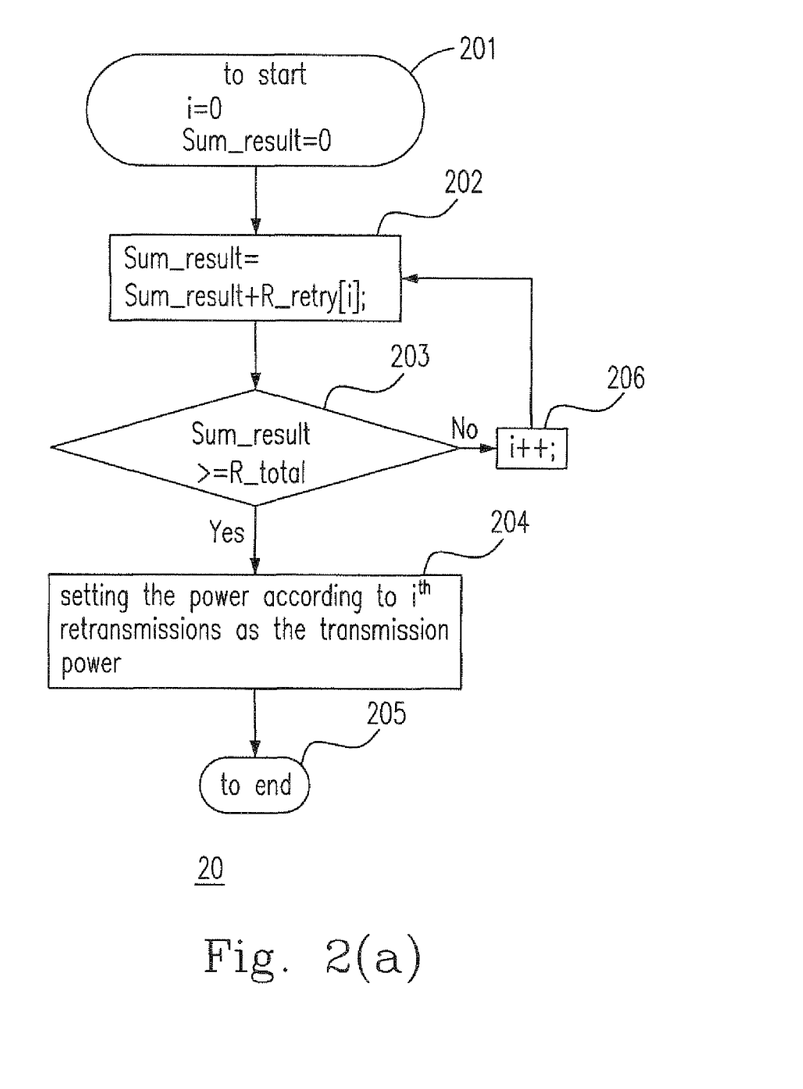
FIG. 2(a) is a flow chart of deciding the transmission power in a third preferred embodiment according to the present invention.

Please refer to FIG. 2(a) illustrating a flow chart of deciding the transmission power P2 in a third preferred embodiment according to the present invention. As an example, the power adjusting apparatus 10 transmits ten test packets in the training period T, wherein the power by which there are zero retransmissions is referred to as a low power, the power by which there is one retransmission is referred to as a medium power, the power by which there are two retransmissions are referred to as a high power, and the power by which there are more than two retransmissions are referred to as the highest power.

Figure 2B:
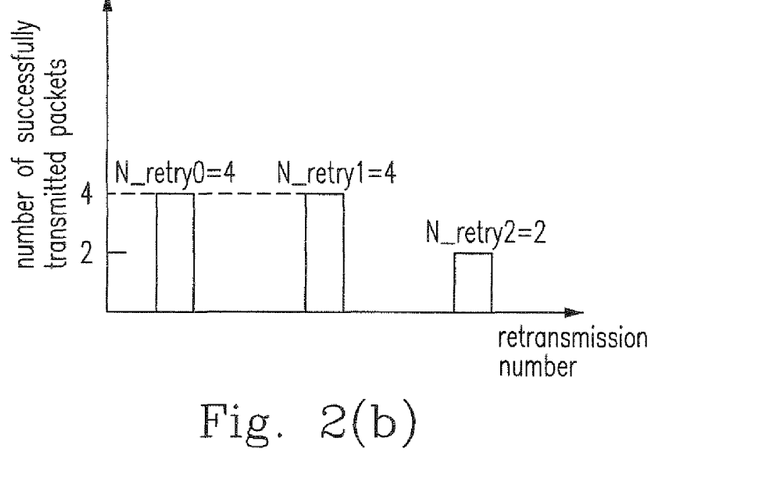
FIG. 2(b) is a graph illustrating the number of successfully transmitted packets in the third preferred embodiment according to the present invention.

Please refer to FIG. 2(b) illustrating the number of successfully transmitted packets in a third preferred embodiment according to the present invention. In FIG. 2(b), the transmission condition for 10 test packets in the training period T is as follows: the number of packets having zero retransmission, i.e. packets successfully transmitted after a first transmission (denoted as retry0), is N_retry0=4, the number of packets successfully transmitted after one retransmission (denoted as retry1) is N_retry1=4, the number of packets successfully transmitted after two retransmissions (denoted as retry2) is N_retry2=2, and the number of packets having more than two retransmissions is N_other=0. The above statistical values are multiplied by the weight values W0, W1, W2, and W_other, respectively, so as to obtain the corresponding weight results R_retry0, R_retry1, R_retry2 and R_other. Here, it is firstly assumed that each of the weight values W0, W1, W2, and W_other is 1, and therefore, their weight results are as follows: R_retry0=N_retry0×W0=4, R_retry1=N_retry1×W1=4, R_retry2=N_retry2×W2=2 and R_other=N_other×W_other=0. The above weight results could be denoted as R_retry=[4, 4, 2, 0] as a numeral sequence. Here, it could be known that the number of all successfully transmitted packets is N_total=10. A composite weight result R_total=10 as a first threshold value could be obtained after multiplying N_total=10 by a composite weight value W_total=1. The processing unit 11 stores N_retry0=4, N_retry1=4, N_retry2=2, N_other=0, N_total=10, R_retry[ ]=[4, 4, 2, 0] and R_total=10 into the memory unit 14 (such as a register) for the operation and judgment.

Notably, the plurality of test packets could be the same packets or different packets. N_total could be a parameter known before a transmission, and could be obtained depending on the accumulation of the packet number of each successful transmission. For example, if it is planned at first to transmit 10 test packets in the training period T, but only 9 test packets are successfully transmitted at the end of the training period T, N_total would be calculated as 9.

Please refer back to FIG. 2(a). The explanations for process 20 are as follows. In step 201, i=0 represents zero retransmissions, i.e. there is only one transmission. Sum_Result represents the successive accumulation result and has an initial value set as 0 in step 201. Step 202 then follows. In step 202, the $i^{th}$ Sum_Result is added to the $i^{th}$ R_retry, i.e. R_retry[i], to obtain the $(i+1)^{th}$ Sum_Result. The above operation in step 202 could be programmed as follows: Sum_Result=Sum_Result+R_retry[i]. In step 203, there is the judgment as to whether the $(i+1)^{th}$ Sum_Result is larger than or equal to the composite weight result R_total. If yes, the power by which there are i transmissions is set as the transmission power P2; in other words, one of the powers LV1, LV2 and LV3 from the plurality of powers P1 is selected as the transmission power P2 (step 204) for transmitting the subsequent packet, and then the process is ended in step 205. If not, i.e., the $(i+1)^{th}$ Sum_Result is smaller than the composite weight result, i is added by 1 in step 206, and then the process proceeds until there is a Sum_Result which is larger than or equal to the R_total.

For example, when there is only one transmission (i=0), the zeroth Sum_Result (having an initial value)+R_retry[0]=the $1^{st}$ Sum_Result, i.e. 0+4=4<R_total=10. Therefore, step 206 where i+1=1 follows. Then step 202 where the $1^{st}$ Sum_Result+R_retry[1]=the $2^{nd}$ Sum_Result (i.e. 4+4=8<R_total=10) follows. Therefore, step 206 where i+1=2 follows. Then step 202 where the $2^{nd}$ Sum_Result+R_retry[2]=the $3^{rd}$ Sum_Result (i.e. 8+2=R_total=10) follows. Therefore, steps 206 where the power by which there are two retransmissions is set as the transmission power P2 follows.

Figure 2C:
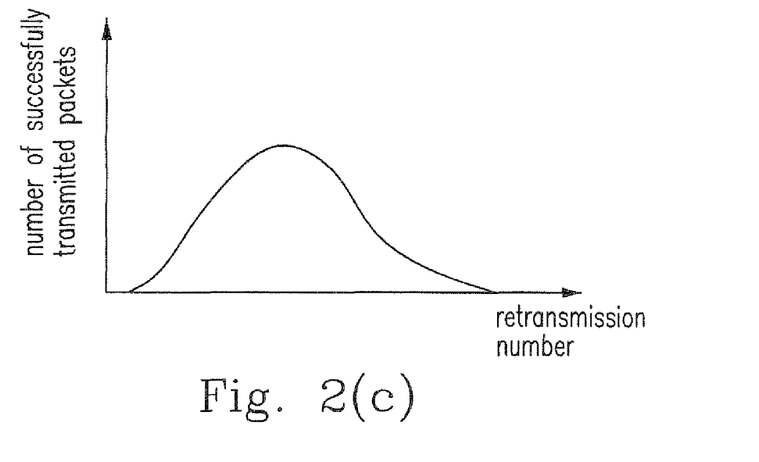
FIG. 2(c) is a normal distribution of a number of successfully transmitted packets in a fourth preferred embodiment according to the present invention.

Please refer to FIG. 2(c) illustrating the normal distribution of the successfully transmitted packets in a fourth preferred embodiment according to the present invention. In FIG. 2(c), the area below the curve represents the number of all of the successfully transmitted packets in the training period T, which include the number of packets successfully transmitted with zero retransmissions, the number of packets successfully transmitted with one retransmission, the number of packets successfully transmitted with two retransmissions, and the number of packets successfully transmitted with more than two retransmissions. In the training period T in the normal distribution, if a suitable transmission power could be selected for the first transmission in order that 80% of all of the test packets could be transmitted successfully, it would be considered that such a method could transmit the subsequent packet in a manner of adaptively selecting the lower power. According to the above concept, the total weight value W_total 10 in the third preferred embodiment according to the present invention could be adjusted as 0.8. In such case, the number of all of the successfully transmitted packets is N_total=10 and could be multiplied by W_total=0.8 to obtain a total weight result R_total=8 as a first threshold value.

If the first threshold value is decreased, in the third preferred embodiment according to the present invention, when there is one retransmission, the operation would be the zeroth Sum_Result+R_retry[1]=the $2^{nd}$ Sum_Result, i.e. 4+4=8=R_total. Then step 204 where the power by which there is one retransmission is set as the transmission power P2 follows.

The fifth preferred embodiment according to the present invention is as follows. In the fifth preferred embodiment, the weight values W0, W1, W2 and W_other are set as a decreasing sequence. For example, W0=10, W1=7, W2=2, and W_other=0. Accordingly, the weight results are R_retry0=N_retry0×W0=40, R_retry1=N_retry1×W1=28, R_retry2=N_retry2×W2=4, and R_other=N_other×W_other=0, respectively. A sequence of the above weight results is a follows: R_retry[ ]=[40, 28, 4, 0]. The composite weight result R_total=60 is used as the first threshold value and could be obtained after multiplying N_total=10 by W_total=6. Accordingly, when i=0, the zeroth Sum_Result+R_retry[0]=the $1^{st}$ Sum_Result, i.e., 0+40=40<60=R_total. When i=1, the first Sum_Result+R_retry[1]=the $2^{nd}$ Sum_Result, i.e. 40+28=68>60=R_total, and thus the condition that the accumulation result Sum_Result is larger than or equal to the composite weight result is met (step 203). Accordingly, the power by which there is one retransmission is set as the transmission power P2. Such method is advantageous since it would be expectable to transmit the subsequent packet by the lower transmission power P2 as far as possible.

Figure 2D:
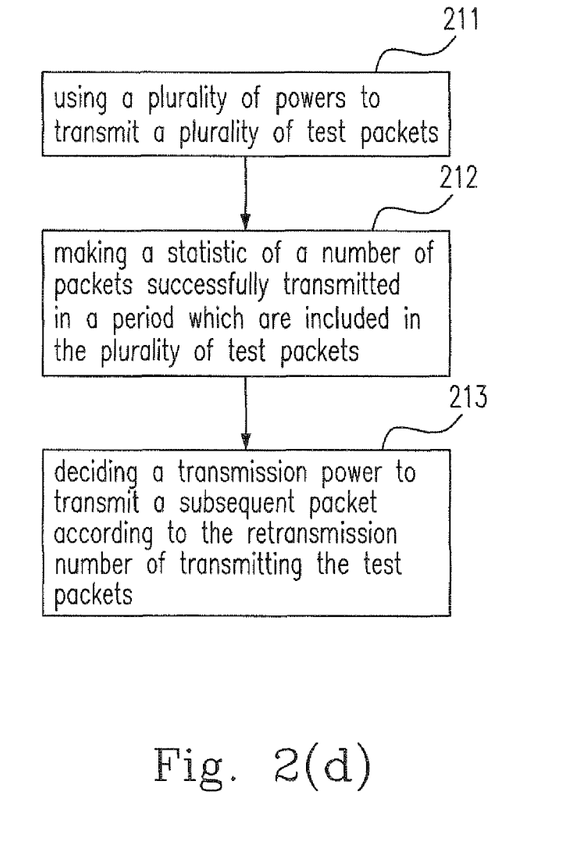
FIG. 2(d) is a flow chart illustrating a method of deciding the transmission power in a fifth preferred embodiment according to the present invention.

Please refer to FIG. 2(d) illustrating a method of deciding the transmission power P2. In step 211, the power adjusting apparatus 10 uses a plurality of powers P1 to transmit a plurality of test packets. In step 212, the processing unit 11 makes a statistic of the packets successfully transmitted in a period and included in the plurality of test packets. In step 213, according to the retransmission number of transmitting the test packets, a transmission power is decided to transmit the subsequent packet.

Figure 3:
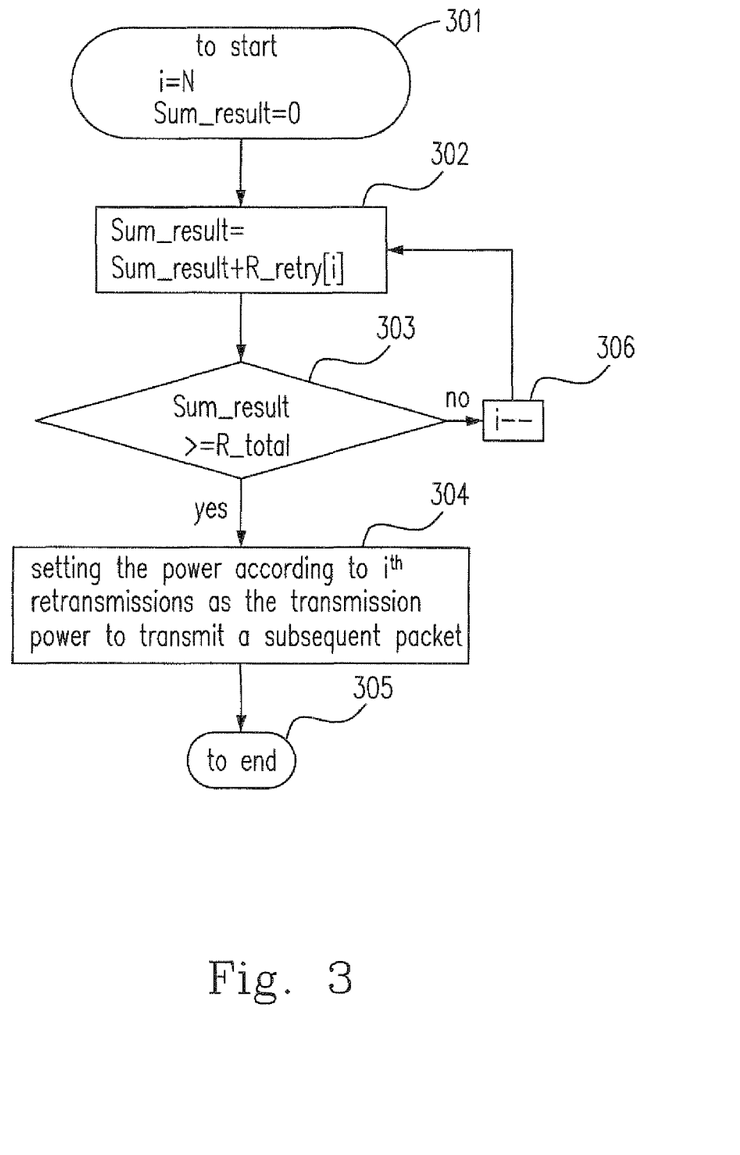
FIG. 3 is a flow chart of deciding the transmission power in a sixth preferred embodiment according to the present invention.

Please refer to FIG. 3 illustrating a flow chart of deciding the transmission power P2 in a sixth preferred embodiment according to the present invention. In the embodiment, the transmission powers are provided from the highest one to the lowest one, and thus the judgment condition is rather different. The situation where 10 test packets are transmitted in the training period T is as follows: the number of packets having zero retransmission, i.e. the packets successfully transmitted after the first transmission (denoted as retry0), is N_retry0=8, the number of packets successfully transmitted after one retransmission (denoted as retry1) is N_retry1=2, the number of packets having more than one retransmission is N_other=0. The packet numbers are multiplied by weight values W0=1, W1=1, and W_other=1, respectively, so as to obtain corresponding weight results R_retry0=8, R_retry1=2, and R_other=0. The composite weight result R_total=10 is used as the first threshold value and could be obtained by multiplying N_total=10 by the composite weight value W_total=1.

In the sixth preferred embodiment, Sum_result represents the successive accumulation result. In step 301, it is assumed at first that i=N=1 and the initial value of Sum_Result is set as 0. In step 302, a current Sum_result having the initial value+R_retry[1]=a new Sum_result, i.e. 0+2=2<10=R_total. Accordingly, after the judgment in step 303, the process proceeds to step 306 where i−1=0. The process then proceeds to step 302 where a current Sum_result+R_retry[0]=2+8=10=R_total. After the judgment in step 303, the process proceeds to step 304, and the power by which there is zero retransmission is selected as the transmission power P2, i.e. the power by which there is only one transmission is selected as the transmission power P2 to transmit the subsequent packet (denoted as D_other). The process is ended in step 305. It could be seen there is the situation that after one retransmission, only 20% of all the packets are successfully transmitted. The reason why there are packets not correctly received may be that the saturation or clipping of the signals received by the receiving terminal occurs since the correct receipt of more packets occurs instead after lowering the transmission power.

Figure 4A:
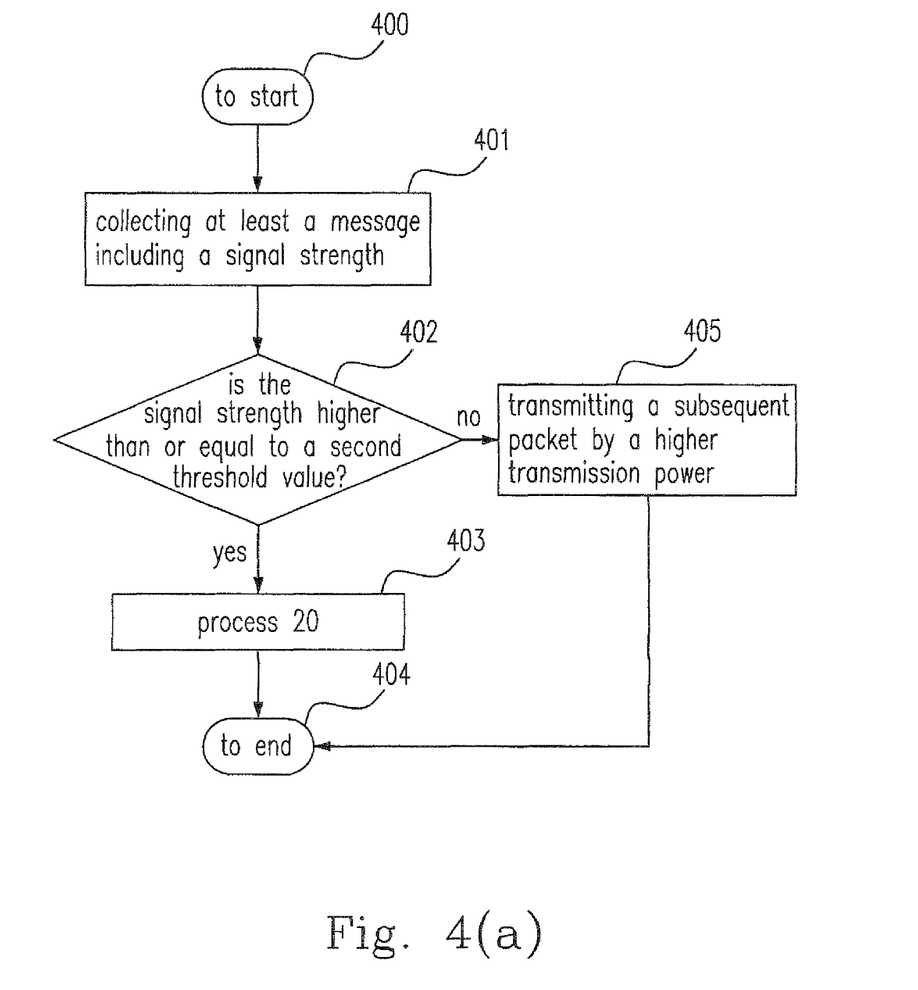
FIG. 4(a) is a flow chart of detecting the signal strength to decide the transmission power in a seventh preferred embodiment according to the present invention.

Please refer to FIG. 4(a) illustrating a flow chart of detecting the signal strength to decide the transmission power P2 in a seventh preferred embodiment according to the present invention. The plurality of powers P1 include a first power and a second power higher than the first power. This embodiment is aimed to judge the strength of the signal received from the receiving terminal by the power adjusting apparatus 10. For example, if it is judged that the signal strength is lower than a second threshold value which is, e.g. 45% of the standard signal strength, the second power is used to transmit the subsequent packet D_other. The process begins from step 400. In step 401, the power adjusting apparatus 10 collects at least one message including a signal strength, SS. If it is judged by the processing unit 11 that the signal strength is higher than or equal to the second threshold value in step 402, then the process proceeds to step 403. What are implemented in step 403 are the same as those in process 20 in FIG. 2(a). Then the process proceeds to step 404 to be ended. The second threshold value could be a first reference signal strength, which, e.g. could be, e.g. 45% of the standard signal strength. If it is judged by the processing unit 11 that the signal strength is lower than the second threshold value in step 402, the process proceeds to step 405 where the processing unit 11 controls the power adjusting apparatus unit 121 to transmit the subsequent packet D_other by the second power. Then the process proceeds to step 404 to be ended. In addition to the signal strength for the judgment, the packet transmission rate could also be used as the judgment condition to decide the transmission power P2.

Figure 4B:
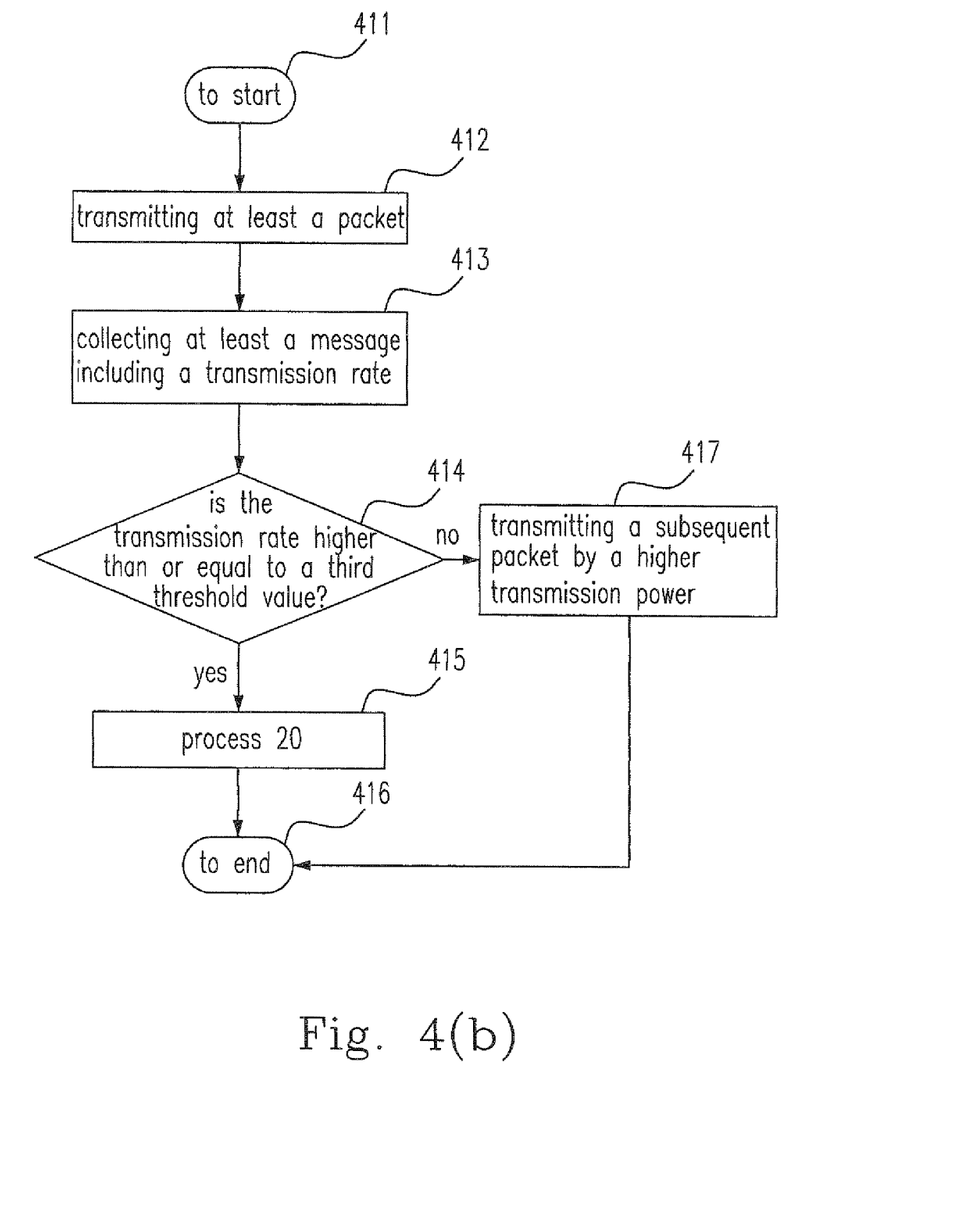
FIG. 4(b) is a flow chart of detecting the transmission rate to decide the transmission power in an eighth preferred embodiment according to the present invention.

Please refer to FIG. 4(b) illustrating a flow chart of detecting the transmission rate to decide the transmission power P2 in an eighth preferred embodiment according to the present invention. A plurality of powers P1 include a first power and a second power, wherein the second power is higher than the first power. The eighth embodiment is aimed to judge the transmission rate of the packet transmitted by the power adjusting apparatus 10, wherein if the transmission rate is lower than a third threshold value which is a first reference transmission rate, the processing unit 11 controls the power adjusting unit 121 to transmit the subsequent packet D_other by the second power. In FIG. 4(b), the process begins from step 411. In step 412, the power adjusting apparatus 10 transmits at least one packet. What are implemented in step 412 could also be replaced by what are implemented in process 20 in FIG. 2(a). In step 413, the power adjusting apparatus 10 collects at least one message including a transmission rate information. If it is judged by the processing unit 11 that the transmission rate is higher than or equal to the third threshold value, the process proceeds to step 415. What are performed in step 415 are the same as those in process 20 in FIG. 2(a). Then the process proceeds to step 416 to be ended. If it is judged by the processing unit 11 that the transmission rate is lower than a third threshold value in step 414, the process proceeds to step 417 where the processing unit 11 controls the power adjusting unit 121 to transmit the subsequent packet D_other by the second power. Then the process proceeds to step 416 to be ended. In addition to the above method, there could also be the alternative one to make the comparison between the strength of the currently received signal and the strength of the signal obtained from the last implementation of the power adjusting mechanism, or the comparison between the transmission rate of the current packet and the transmission rate of the packet obtained from the last implementation of the power adjusting mechanism, wherein the judgment condition is such that when the signal strength or the transmission rate of the current signal is not significantly changed, there is the continuation of using the last transmission power.

Figure 5A:
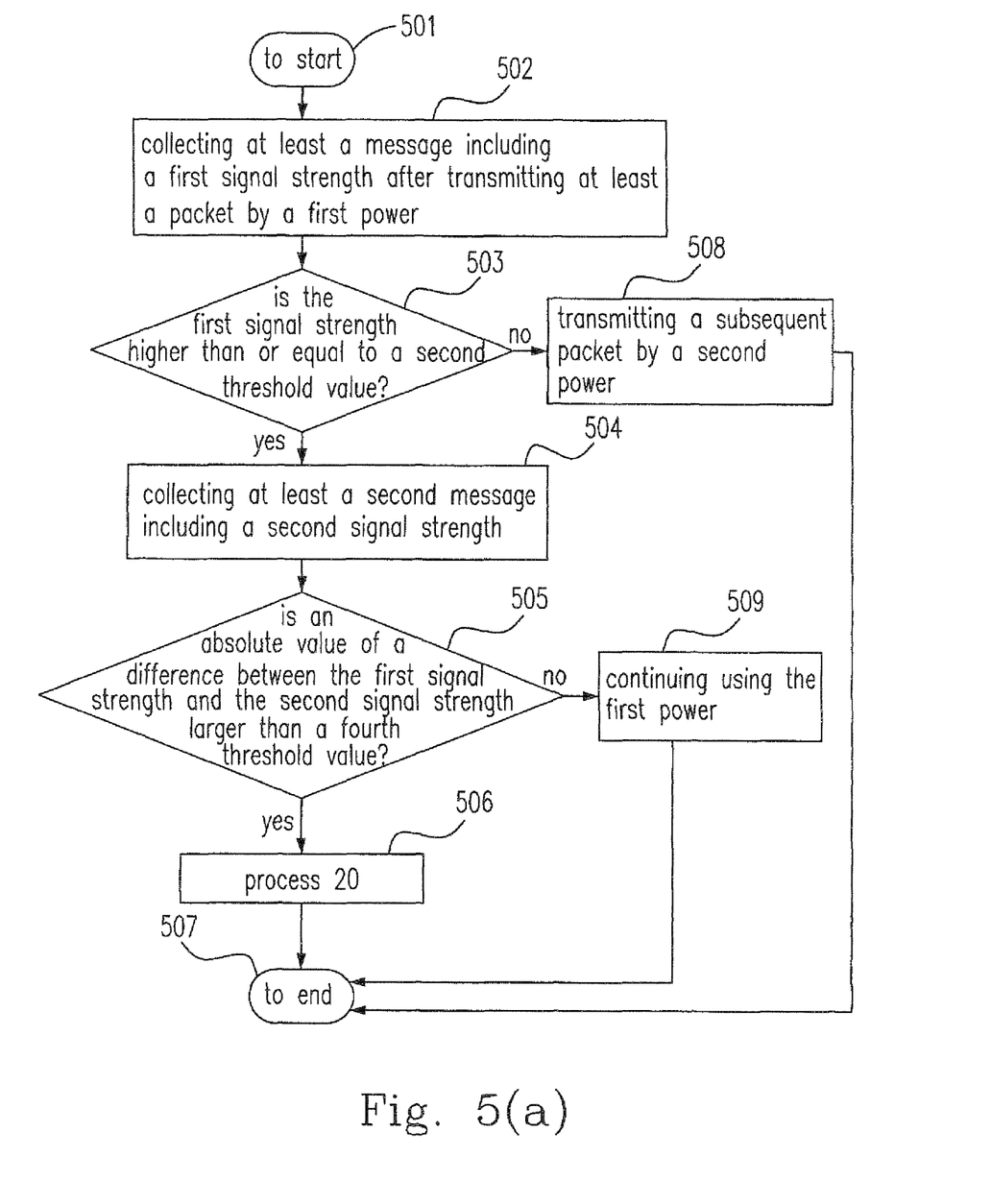
FIG. 5(a) is a flow chart of judging the signal strength difference to obtain the transmission power in a ninth preferred embodiment according to the present invention.

Please refer to FIG. 5(a) illustrating a flow chart of judging the signal strength difference to obtain the transmission power P2 in the ninth preferred embodiment according to the present invention. The plurality of powers P1 include a first power and a second power higher than the first power. The process begins from step 501. Then, in step 502, the processing unit 11 collects at least one message including a first signal strength after transmitting at least a packet by a first power. Then, if it is judged by the processing unit 11 that the first signal strength is lower than the second threshold value in step 503, the process proceeds to step 508 where the processing unit 11 controls the power adjusting unit 121 to transmit the subsequent packet D_other by the second power. Then the process proceeds to step 507 to be ended. When it is judged by the processing unit 11 that the first signal strength is higher than or equal to a second threshold value, the process proceeds to step 504 where the processing unit 11 collects at least a second message including a second signal strength. Then the process proceeds to step 505. If it is judged by the processing unit 11 that an absolute value of the difference between the first signal strength and the second signal strength is larger than or equal to the fourth threshold value, the process proceeds to step 509 where the power adjusting apparatus 10 continues using the first power. If it is judged by the processing unit 11 that the absolute value of the difference between the first signal strength and the second signal strength is larger than the fourth threshold value, the process proceeds to step 506. What are implemented in step 506 are the same as those in process 20 in FIG. 2(a). Then the process proceeds to step 507 to be ended. The fourth threshold value which could be a second reference signal strength is, e.g. 45% of the standard signal strength. Similarly, a transmission rate could be used for a judgment condition.

Figure 5B:
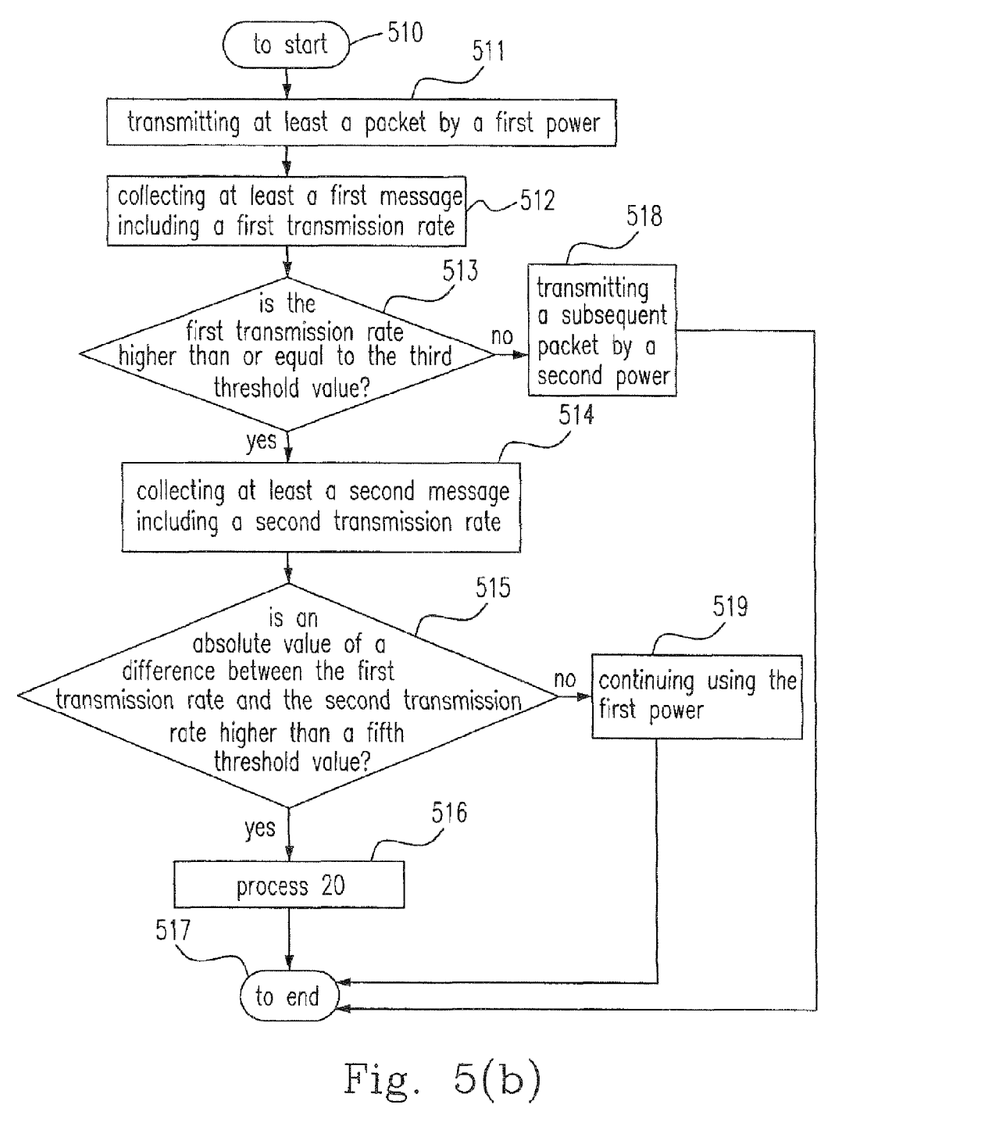
FIG. 5(b) is a flow chart of judging the transmission rate difference to obtain the transmission power in a tenth preferred embodiment according to the present invention.

Please refer to FIG. 5(b) illustrating a flow chart of judging the transmission rate difference to obtain the transmission power P2 in a tenth preferred embodiment according to the present invention. The plurality of powers P1 include a first power and a second power higher than the first power. In FIG. 5(b), the process begins from step 510. In step 511, the power adjusting apparatus 10 transmits at least a packet. Step 511 could also be replaced by what are implemented in process 20 in FIG. 2(a). Then in step 512, the processing unit 11 collects at least one first message including a first transmission rate. Then, if it is judged by the processing unit 11 that the first transmission rate is lower than the third threshold value in step 513, the process proceeds to step 518 where the processing unit 11 controls the power adjusting unit 121 to transmit the subsequent packet D_other by the second power. Then the process proceeds to step 517 to be ended. If it is judged by the processing unit 11 that the first transmission rate is higher than or equal to the third threshold value, the process proceeds to step 514 where the processing unit 11 collects at least a second message including a second transmission rate. Then the process proceeds to step 515. If it is judged by the processing unit 11 that an absolute value of the difference between the first transmission rate and the second transmission rate is smaller than or equal to a fifth threshold value which is a second reference transmission rate, the power adjusting apparatus 10 continues using the first power P1 in step 519. If it is judged by the processing unit 11 that an absolute value of the difference between the first transmission rate and the second transmission rate is larger than the fifth threshold value, the process proceeds to step 516. What are implemented in step 516 are the same as those implemented in process 20 in FIG. 2(a). Then the process proceeds to step 517 to be ended.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims that are to be accorded with the broadest interpretation so as to encompass all such modifications and similar structures.

What is claimed is:

1. A power adjusting apparatus communicating with a remote terminal, the power adjusting apparatus comprising:
   a transceiving unit transmitting a plurality of test packets by a plurality of powers during a training period; and a processing unit coupled to the transceiving unit, and deciding a transmission power for transmitting a subsequent packet according to a statistic of at least one test packet number corresponding to at least one retransmission number of transmitting the plurality of test packets during the training period, wherein the transceiving unit receives a related message, the processing unit decides the transmission power according to the related message, and wherein the related message includes an ACK timeout information and an ACK information, each of which is related to the retransmission number of transmitting the test packets.

2. An apparatus as claimed in claim 1, wherein:

the transceiving unit receives a related message and includes a power adjusting unit using the plurality of powers to transmit the test packets, and the plurality of powers include a first power and a second power higher than the first power;

the processing unit includes a memory unit storing a total number, a first number and a second number, wherein:

the total number is a total number of the test packets;

the first number is a number of packets having zero retransmission, is related to the related message, and corresponds to the first power;

the second number is a number of packets having one retransmission, is related to the related message, and corresponds to the second power;

when the first number is equal to the total number, the transceiving unit uses the first power as the transmission power to transmit the subsequent packet; and when the first number and the second number have a sum equal to the total number, the transceiving unit uses the second power as the transmission power to transmit the subsequent packet.

3. An apparatus as claimed in claim 2, wherein:

the memory unit further stores a composite weight value, and when the first number is larger than or equal to a product of multiplying the total number by the composite weight value, the transceiving unit uses the first power as the transmission power to transmit the subsequent packet; and when the first number and the second number have a sum larger than or equal to the product, the transceiving unit uses the second power as the transmission power to transmit the subsequent packet, wherein the composite weight value is ranged from 0 to 1.

4. An apparatus as claimed in claim 2, wherein:

the memory unit further stores a composite weight value, a first weight value, a second weight value, a composite weight result, a first weight result, and a second weight result;

when the first weight result is larger than or equal to the composite weight result, the transceiving unit uses the first power as the transmission power to transmit the subsequent packet; and when the first weight result and the second weight result have a sum larger than or equal to the composite weight result, the transceiving unit uses the second power as the transmission power to transmit the subsequent packet, wherein the composite weight result is equal to a product of multiplying the composite weight value by the total number, the first weight result is equal to a product of multiplying the first number by the first weight value, and the second weight result is equal to a product of multiplying the second number by the second weight value.

5. A power adjusting method, comprising a following step of:

gathering a statistic of at least one test packet number, wherein the at least one test packet number corresponds to at least one retransmission number of transmitting a plurality of test packets during a training period; and deciding a transmission power for transmitting a subsequent packet by selecting one of a plurality of powers according to the statistic, wherein the plurality of powers include a first power and a second power higher than the first power, and the method further comprises following steps of:

receiving a related message, wherein the related message is related to a total number, a first number and a second number, the total number is a total number of the test packets, the first number is a number of packets having zero retransmissions, and corresponds to the first power, and the second number is a number of packets having one retransmission, and corresponds to the second power;

using the first power as the transmission power to transmit the subsequent packet when the first number is equal to the total number; and using the second power as the transmission power to transmit the subsequent packet when the first number and the second number have a sum being equal to the total number.

6. A method as claimed in claim 5, further comprising following steps of:

providing a composite weight value;

using the first power as the transmission power to transmit the subsequent packet when the first number is larger than or equal to a product of multiplying the total number by the composite weight value; and using the second power as the transmission power to transmit the subsequent packet when the first number and the second number have a sum being larger than or equal to the product, wherein the composite weight value is ranged from 0 to 1.

7. A method as claimed in claim 5, further comprising following steps of:

providing a composite weight value, a first weight value, a second weight value, a composite weight result, a first weight result and a second weight result;

using the first power as the transmission power to transmit the subsequent packet when the first weight result is larger than or equal to the composite weight result; and using the second power as the transmission power to transmit the subsequent packet when the first weight result and the second weight result have a sum being larger than or equal to the composite weight result, wherein the composite weight result is equal to a product of multiplying the composite weight value by the total number, the first weight result is equal to a product of multiplying the first weight value by the first number, and the second weight result is equal to a product of multiplying the second weight value by the second number.

8. A method as claimed in claim 5, wherein the method further comprises following steps of:

performing the deciding step when it is determined that a signal strength included in a collected message is higher than or equal to a reference signal strength.

9. A method as claimed in claim 5, wherein the method further comprises following steps of:

performing the deciding step when it is determined that a transmission rate which is included in a collected message is higher than or equal to a reference transmission rate.

10. A method as claimed in claim 5, wherein the method further comprises following steps of:
- collecting a first message including a first signal strength;
- collecting a second message including a second signal strength;
- providing an absolute value of a difference between the first signal strength and the second signal strength, wherein it is determined that the first signal strength is higher than or equal to a first reference signal strength;
- determining whether the absolute value is higher than or equal to a second reference signal strength; and
- performing the deciding step when the absolute value is higher than or equal to the second reference signal strength.

11. A method as claimed in claim 5, wherein the method further comprises following steps of:
- collecting a first message including a first transmission rate;
- collecting a second message including a second signal strength;
- providing an absolute value of a difference between the first transmission rate and the second transmission rate, wherein it is determined that the first transmission rate is higher than or equal to a first reference transmission rate;
- determining whether the absolute value is higher than or equal to a second reference transmission rate; and
- performing the deciding step when the absolute value is higher than or equal to the second reference transmission rate.

12. A power adjusting apparatus communicating with a remote terminal, the apparatus comprising:
- a transceiving unit transmitting a test packet by a plurality of powers; and
- a processing unit coupled to the transceiving unit, and deciding a transmission power based on one of an ACK message and an ACK timeout message associated with the test packet to transmit a subsequent packet, wherein the plurality of powers include a first power and a second power higher than the first power, and after the transceiving unit transmits the test packet by the first power and then receives the ACK timeout message, the transceiving unit transmits the test packet by the second power.

13. An apparatus as claimed in claim 12, wherein the plurality of powers include a first power and a second power lower than the first power, and after the transceiving unit transmits the test packet by the first power and then receives the ACK message, the transceiving unit transmits the test packet by the second power, and wherein when the transceiving unit transmits the test packet by the second power and then receives the ACK timeout message, the transceiving unit transmits the subsequent packet by the first power as the transmission power.

* * * * *